United States Patent [19]

Su

[11] Patent Number: 4,713,205
[45] Date of Patent: Dec. 15, 1987

[54] METHOD FOR REDUCING MELT FRACTURE DURING EXTRUSION OF LINEAR POLYETHYLENE HOMOPOLYMERS AND COPOLYMERS BY VARYING THE GEOMETRY OF THE DIE EXIT FACE

[75] Inventor: Tien-Kuei Su, Pittsford, N.Y.

[73] Assignee: Mobil Oil Corporation, New York, N.Y.

[21] Appl. No.: 780,051

[22] Filed: Sep. 25, 1985

[51] Int. Cl.$^4$ .................. B29C 47/12; B29C 47/20
[52] U.S. Cl. ............................ 264/176.1; 264/564; 264/177.15; 264/209.1; 264/209.8; 264/211.21; 425/326.1; 425/461
[58] Field of Search ............. 264/176 R, 564, 211.21, 264/176.1, 209.1, 177.15, 209.8; 425/113, 461, 326.1

[56] References Cited

U.S. PATENT DOCUMENTS

| | | | |
|---|---|---|---|
| 3,032,822 | 5/1962 | Maddock | 264/211.21 |
| 3,382,535 | 5/1968 | Ferrari | 425/461 |
| 3,920,782 | 11/1975 | Cogswell | 264/176 R |
| 4,093,692 | 6/1978 | Hill | 264/176.1 |
| 4,178,411 | 12/1979 | Cole et al. | 264/176.1 |
| 4,187,269 | 2/1980 | Hutchinson et al. | 264/171 |
| 4,267,146 | 5/1981 | Kurtz et al. | 264/564 |
| 4,282,177 | 8/1981 | Kurtz et al. | 264/564 |
| 4,348,349 | 9/1982 | Kurtz | 264/564 |
| 4,360,494 | 11/1982 | Kurtz | 264/564 |

OTHER PUBLICATIONS

J. A. Brydson, *Flow Properties of Polymer Melts*, pp. 79–83, Van Nostrand-Reinhold, (1970).
Tordella, "Capillary Flow of Molten Polyethylene—A Photographic Study of Melt Fracture", *Transaction of the Society of Rheology*, vol. 1, 203–212, (1957); and Vlachopoulos et al., A Comparison of Melt Fracture Initiation Conditions in Capillaries and Slits, *Journal of Applied Polymer Science*, vol. 21, 1177–1187, (1977).

*Primary Examiner*—Jeffery Thurlow
*Attorney, Agent, or Firm*—Alexander J. McKillop; Michael G. Gilman; Charles J. Speciale

[57] ABSTRACT

A die geometry which reduces the incidence or degree of melt fracture in the extrusion of linear polyethylene homopolymers and/or copolymers is described.

4 Claims, 5 Drawing Figures

MOLTEN POLYETHYLENE FROM EXTRUDER

RESIN 1   Extrusion Conditions: 190°C at 1500 Sec$^{-1}$

EXTRUSION DIE
ASPECT RATIO

10

20

60

RESIN 2   Extrusion Conditions: 190°C at 3000 Sec$^{-1}$

10

20

60

RESIN 3   Extrusion Conditions: 175°C at 3000 Sec$^{-1}$

10

20

60

METHOD FOR REDUCING MELT FRACTURE DURING EXTRUSION OF LINEAR POLYETHYLENE HOMOPOLYMERS AND COPOLYMERS BY VARYING THE GEOMETRY OF THE DIE EXIT FACE

BACKGROUND OF THE INVENTION

This invention relates to methods for extruding polymers and, more particularly, to extrusion methods which reduce the incidence and/or degree of melt fracture in linear polyethylene homopolymers and copolymers by variations in the geometry of the extrusion die exit face.

"Melt fracture" is a term used to describe the surface irregularity which occurs during extrusion of some thermoplastic materials under certain conditions of flow rate and melt temperature. It is characterized by a series of ridges perpendicular to the flow direction and is described, for example, by J. A. Brydson, *Flow Properties of Polymer Melts*, pages 78-81, Van Nostrand-Reinhold (1970). Melt fracture may be formed during extrusion of several different thermoplastic materials, notably, linear polyethylene homopolymers/copolymers. Within a film extruder and extrusion die, such resins undergo severe shearing deformation with the result that melt fracture can result. To lessen this possibility, the extruder can be operated at a reduced flow rate but this expedient carries with it the penalty of reduced productivity.

A number of approaches to reducing melt fracture and a particular kind of melt fracture referred to as "sharkskin" have been explored and are discussed, for example, in U.S. Pat. Nos. 3,879,507; 3,920,782; 4,187,269; 4,267,146; 4,282,177; 4,348,349; and, 4,360,494. Other publications exploring the phenomenon of melt fracture are Tordella, "Capillary Flow of Molten Polyethylene—A Photographic Study of Melt Fracture", *Transaction of the Society of Rheology*, Vol. 1, 203-212 (1957) and Vlachopoulos et al., "A Comparison of Melt Fracture Initiation Conditions in Capillaries and Slits", *Journal of Applied Polymer Science*, Vol. 21, 1177-1187 (1977).

SUMMARY OF THE INVENTION

It has now been discovered that melt fracture of a linear polyethylene homopolymer/copolymer can be appreciably reduced or even avoided by extruding the polymer under a predetermined set of extrusion conditions through a die having a substantially lower aspect ratio (defined as the ratio of die length, or land, to die width, or gap, at the exit face) compared to the aspect ratio of a die which results in an extrudate possessing significant melt fracture under substantially the same extrusion conditions.

Employing the method of this invention, it is possible to operate the extruder under conditions which would otherwise result in more or less significant melt fracture in the linear polyethylene extrudate. The higher throughputs resulting from the present extrusion method provide greater manufacturing efficiencies and economies.

DESCRIPTION OF THE PREFERRED EMBODIMENTS

Figure 1:
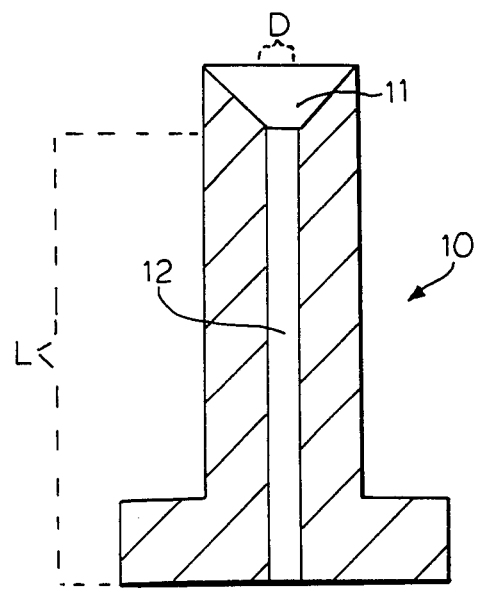
FIG. 1 is a longitudinal cross-sectional view of a capillary extrusion die suitable for use in the practice of the method of the subject invention.

The linear polyethylene homopolymers and copolymers which are advantageously extruded in accordance with the method of this invention are derived from at least about 90 mol percent of ethylene with up to about 10 mol percent of one or more $C_{3-6}$ alpha olefins, preferably propylene, butene-1, pentene-1 or hexene-1.

The ethylene polymers have a melt flow ratio of about 18 to about 32, and preferably from about 22 to about 32. The melt flow ratio value is another means of indicating the molecular weight distribution of a polymer. The melt flow ratio (MFR) range of from about 22 to about 32 thus corresponds to a Mw/Mn value range of about 2.7 to 4.1. The polymers herein include a Mw/Mn value in the range of about 2.2 to 4.1.

The homopolymers have a density of from about 0.958 to about 0.972 and preferably from about 0.961 to about 0.968.

The copolymers have a density of from about 0.91 to about 0.96 and preferably from about 0.917 to about 0.955, and most preferably from about 0.917 to about 0.935. The density of the copolymer, at a given melt index level for the copolymer, is primarily regulated by the amount of the $C_3$ to $C_6$ comonomer which is copolymerized with the ethylene. In the absence of the comonomer, the ethylene would homopolymerize to provide homopolymers having a density of about 0.96. Thus, the addition of progressively larger amounts of the comonomers to the copolymers results in a progressive lowering of the density of the copolymer. The amount of each of the various $C_{3-6}$ comonomers needed to achieve the same result will vary from monomer to monomer, under the same reaction conditions.

Thus to achieve the same results in the copolymers in terms of a given density at a given melt index level, larger molar amounts of the different comonomers would be needed in the descending order of from $C_3$ to $C_6$.

The ethylene polymers of the present invention have an unsaturated group content of about 1 and usually from about 0.1 to about 0.3 C=C/1000 carbon atoms, and a cyclohexane extractables content of less than about 3, and preferably less than about 2, weight percent.

The homopolymers of the present invention are granular materials which have an average particle size of the order of about 0.005 to about 0.06 inches, and preferably of about 0.02 to about 0.04 inches, in diameter. The homopolymers of the present invention have a settled bulk density of about 15 to about 32 pounds per cubic foot.

The homopolymers and copolymers of the present invention are useful for making film.

For film making purposes the preferred copolymers of the present invention are those having a density of from about 0.917 to about 0.924; a molecular weight distribution (Mw/Mn) of from about 2.7 to about 3.6 and preferably from about 2.8 to about 3.1; and a standard melt index from about 0.5 to about 5.0 and preferably from about 1.0 to about 4.0. The films have a thickness greater than 0 up to about 10 mils and preferably greater than 0 up to about 5 mils.

Referring now to FIG. 1, orifice, or exit face, 11 of capillary extrusion die 10 possesses a diameter, or width, D of about 0.05 cm and the die land 12 possesses a length L of about 0.5 cm for an aspect ratio of 10:1 (or simply "10"). Such an aspect ratio is substantially less than that of a conventional capillary extrusion die which is typically in the range of about 20 to 60 or more for a given set of extrusion conditions.

Determination of the maximum aspect ratio for a given set of extrusion temperature and shear rate ($Sec^{-1}$) conditions which can be utilized without incurring significant melt fracture can be readily determined experimentally. Thus, for the three resins whose properties are given in Table I below, the maximum aspect ratio of the capillary extrusion die for a variety of extrusion conditions was determined to be that shown in Table II.

TABLE I
PROPERTIES OF EXTRUDED RESINS

| Resin | Type | Trade name | Manufacturer | Density · g/cc | Flow Index g/10 min | Melt Temp. °C. |
|---|---|---|---|---|---|---|
| 1 | HM HDPE | Dow 62075 | Dow | 0.9525 | 0.10 | 133 |
| 2 | HM HDPE | Hoechst 9255 F2 | Hoechst | 0.9520 | 0.07 | 132 |
| 3 | HDPE | TR 130 | Phillips | 0.9390 | 0.30 | 129 |

TABLE II
MAXIMUM ASPECT RATIOS OF EXTRUSION DIE

| Resin | Extrusion Temperature (°C.) | Shear Rate ($Sec^{-1}$) | Maximum Aspect Ratio |
|---|---|---|---|
| 1 | 180 | 200 | 40 |
| 2 | 240 | 200 | 60 |
| 3 | 290 | 200 | 80 |
| 1 | 180 | 1000 | 20 |
| 2 | 240 | 1000 | 30 |
| 3 | 290 | 1000 | 40 |
| 1 | 180 | 3000 | 5 |
| 2 | 240 | 3000 | 8 |
| 3 | 290 | 3000 | 10 |

By way of demonstrating the advantages of employing a capillary extrusion die of comparatively low aspect ratio under varying sets of extrusion conditions compared to the use of capillary extrusion dies of considerably larger aspect ratio, the resins of Table I were extruded under the conditions indicated in Table III:

TABLE III
EXTRUSION CONDITIONS

| Resin | Extrusion Temperature (°C.) | Shear Rate ($Sec^{-1}$) | Aspect Ratio | Appearance of Extrudate |
|---|---|---|---|---|
| 1 | 190 | 1500 | 10 | slight |
| 2 | 190 | 1500 | 20 | extreme |
| 3 | 190 | 1500 | 60 | moderate |
| 1 | 190 | 3000 | 10 | negligible |
| 2 | 190 | 3000 | 20 | extreme |
| 3 | 190 | 3000 | 60 | moderate–extreme |
| 1 | 175 | 3000 | 10 | not apparent |
| 2 | 175 | 3000 | 20 | slight |
| 3 | 175 | 3000 | 60 | moderate |

Figure 3:
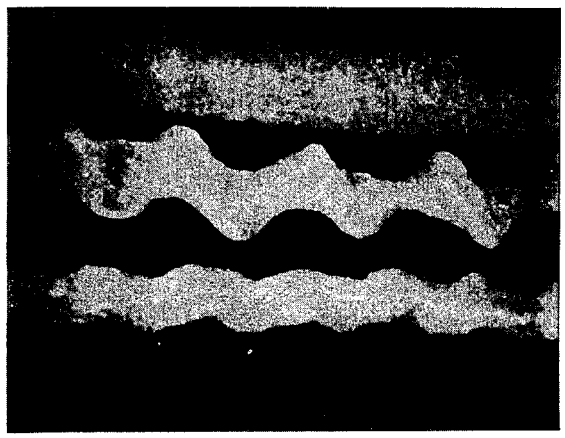
Figure 4:
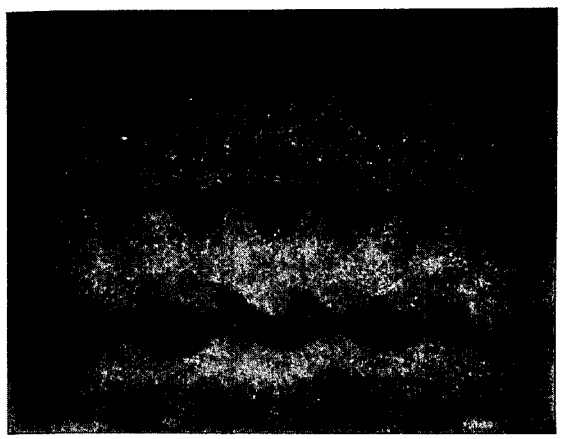
Figure 5:
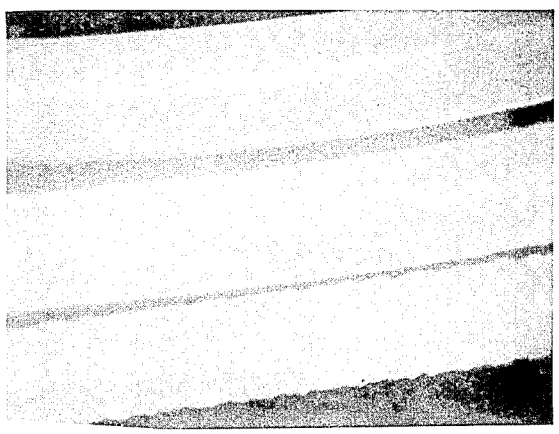

The beneficial effect of employing an extrusion die of reduced aspect ratio can be readily appreciated from the microphotographs (9×enlargement) of FIGS. 3 to 5 herein which show the relative degree of melt fraction encountered in carrying out the extrusion operations summarized in Table III.

Figure 2:
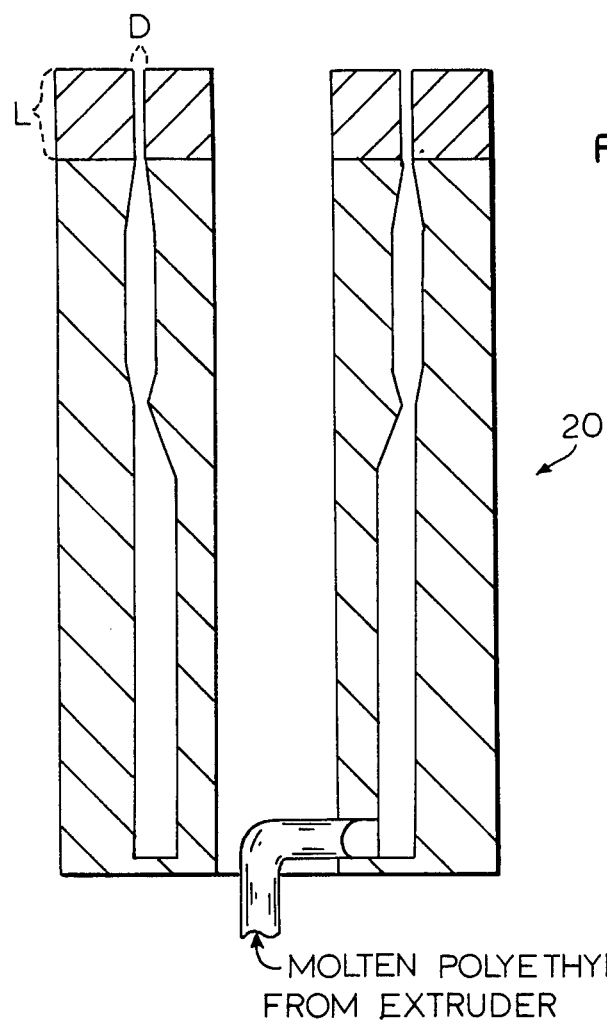
FIG. 2 is a longitudinal cross-sectional view of an annular extrusion die embodying the principle of the extrusion method herein; and, FIGS. 3-5 are microphotographs (9×enlargement) comparing extrudates obtained in accordance with this invention and extrudates obtained in accordance with a known extrusion process.

Comparable results are observed with other types of extrusion dies, e.g., slot dies and annular dies such as the one shown in FIG. 2 in which the ratio of land L of die 20 to the width, or gap, D of the annular orifice at the die exit face is of a relatively low value.

What is claimed is:

1. In a method for extruding a linear homopolymer and/or copolymer of ethylene obtained from the polymerization of ethylene with up to 10 mol percent of a $C_{3-6}$ alpha olefin in which said linear homopolymer and/or copolymer is extruded through a first die having a first aspect ratio that exceeds 10 and under conditions of temperature and shear rate as to provide an extrudate exhibiting significant melt fracture, the improvement which comprises extruding said linear homopolymer and/or copolymer at said temperature and shear rate but substituting for said first die, a second die having a maximum aspect ratio of 10, said second die providing an extrudate of significantly reduced melt fracture.

2. The method of claim 1 wherein the extrusion die is of the capillary, slot or annular variety.

3. The method of claim 1 wherein the linear homopolymer and/or copolymer of ethylene is a medium to high density polyethylene.

4. The method of claim 1 wherein the linear homopolymer and/or copolymer of ethylene is a low density polyethylene.

* * * * *